United States Patent Office 3,293,299
Patented Dec. 20, 1966

3,293,299
PROCESS FOR MAKING TETRAKIS (DIMETHYL-AMINO)ETHYLENE
Herbert Boden, Wilmington, Del., assignor to E. I. du Pont de Nemours and Company, Wilmington, Del., a corporation of Delaware
No Drawing. Filed Oct. 4, 1965, Ser. No. 492,871
5 Claims. (Cl. 260—583)

This is a continuation-in-part application of Serial No. 289,726, filed June 21, 1963, now abandoned.

This invention relates to, and has as its principal object provision of improvements in the manufacture of tetrakis(dimethylamino)ethylene (TMAE) by the reaction between chlorotrifluoroethylene (CTFE) and dimethylamine (DMA).

Pruett et al., J. Am. Chem. Soc. 72, 3646 (1950). disclose the preparation of TMAE by reacting DMA with CTFE accomplished by direct addition of chlorotrifluoroethylene gas to liquid dimethylamine under pressure followed by distillation of the liquid part of the product.

In accordance with the present invention, improved yields and purity of product are achieved by a multistep process including the following:

(1) Reacting chlorotrifluoroethylene and dimethylamine in an amine:ethylene mole ratio ranging from 8:1 to 20:1 and at a temperature not above 70° C., the pressure being autogenous;

(2) Rising the temperature to 70° C. and separating the lower layer of by-product molten salt [$(CH_3)_2NH \cdot HCl$, $3(CN_3)_2NH \cdot HF$];

(3) Cooling the remaining product to room or ambient temperature and drowning the same in 1 to 10 vols. of water per volume of product at 40° C. or lower;

(4) Permitting the drowned product to stand and divide into an upper layer of TMAE and a lower layer consisting principally of water and dissolved by-products and then discharging the lower layer; and (5) Purifying the resultant TMAE by a second water washing followed by contact with activated alumina or the like as by passage through a column packed therewith, whereby purified TMAE is obtained.

The product of this process is a light-colored greenish-yellow liquid boiling at 36.7° C. at 1 mm. of Hg pressure. It is useful as a polymerization initiator, e.g., for vinyl polymerizations. The pure compound is stable to water. It is, however, reactive towards oxygen, being, in fact, chemiluminescent as noted by Pruett et al. All steps of the present process must, therefore, be carried out in an inert atmosphere and the product stored out of contact with air. At temperatures above about 70° C. the reaction between TMAE and oxygen becomes uncontrollable and may result in fires or explosions. Great care in handling the compound is essential.

In accomplishing Step 1 to the process of the invention, an improved yield is obtained when the mole ratio of the reactants DMA/CTFE is maintained in the range 8/1 to 20/1. An excess of DMA is desired not only to insure quantitative conversion but to act as a heat-transfer agent. The latter function, important because of the critical temperature requirements of the step, can be taken over to some extent by use of an inert diluent, but an excess of DMA is preferred. Suitable inert diluents include tetrahydrofuran, hydrocarbons such as benzene, toluene, xylene, hexane, and the like.

The reaction temperature for Step 1 is rigidly controlled between about 45° and 70° C., the range 50–65° C. being preferred. Above 70° C. yields fall off while below 45° C. conversion decreases and reaction time is unduly prolonged. Step 1 is generally carried out in a sealed oxygen-free jacketed reactor, water cooling being used as desired to control the reaction temperature.

The reactants of Step 1, i.e., dimethylamine and chlorotrifluoroethylene, are both commercial products and commercial material can be used. The reactants should be anhydrous, although, as shown in Example 8 below, some water can be tolerated.

In a preferred method of carrying out the physical manipulations of Step 1, the two reactants dimethylamine and chlorotrifluoroethylene are charged together at ambient or lower temperature into an autoclave or reactor made of some inert material, the reactor is sealed in the absence of oxygen, agitated, and heated to a reaction temperature of about 50–60° C. for 30 minutes to an hour. Pressure is autogenous. As the reaction proceeds, external cooling is required to maintain the desired reaction temperature. The reaction is usually complete in from 4 to 10 hours.

In an alternative method of carrying out Step 1, DMA alone is charged into the autoclave, is agitated and is heated to 50–60° C. The other reactant, gaseous CTFE, is then pressured into the autoclave. The reaction under such conditions can be controlled by adjusting the CTFE feed rate and the temperature of the cooling water.

When the reaction of Step 1 is complete, agitation is stopped and Step 2 is accomplished. The temperature of the reactor is initially raised to 70° C. The contents separate into two liquid layers, the lower one being molten by-product salts and the upper one being crude TMAE. The reactor is opened from the bottom via suitable valve means under an inert blanket provided by nitrogen, argon or the like, and the bottom liquid layer is drawn off. This separation is essential because, if the by-product salts are not removed, the reaction mass partially solidifies upon cooling, thereby rendering subsequent processing steps more difficult.

After the two layers from Step 2 have been separated, Step 3 is accomplished by permitting that portion of the product containing TMAE to cool under a nitrogen atmosphere to ambient temperature. The cooled crude TMAE is then mixed with agitation with one to ten times its volume of essentially oxygen-free water at a temperature not exceeding 40° C. Agitation is stopped, and the mixture is allowed to settle and divide into an upper TMAE layer and the lower aqueous solution (Step 4). After the division of the layers is complete, the separation of the lower layer is accomplished by withdrawing the aqueous layer or removing it by other means.

Step (5) consists of (a) a second water wash, (b) removal of the water layer, and (c) treatment of TMAE with an absorbent such as activated alumina. Other absorbents such as silica gel, molecular sieves (zeolites or aluminum silicates), activated carbon, and the like can be used, but anhydrous technical, activated alumina is preferred. The crude TMAE, usually containing some water, is simply passed through a column of 80–200 mesh alumina powder. Treatment with alumina improves the chemiluminescent properties of the material to a degree that cannot be achieved by distillation (see Example 9 below).

There follow some nonlimiting examples which serve to illustrate the invention. In these examples, the oxygen was always rigidly excluded from the system. Pressures in closed reactors were autogenous, otherwise ambient unless noted.

*Example 1*

Liquid anhydrous dimethylamine (37.25 lb.) was charged, with cooling, into a dry evacuated autoclave. With continued cooling and vigorous agitation, a total of 6.0 lb. of chlorotrifluoroethylene (16: 1 amine: ethylene molar ratio) was fed into the reaction mixture as quickly as possible consistent with maintaining the reaction temperature below 40° C. The reaction temperature was then raised to 55° C. and held in the range 55–65° C. until reaction was complete (about 5 hours). After approximately one hour at this temperature the reaction became exothermic and, as a result, moderation of the jacket temperature was necessary to control the reaction in the 60–65° C. range. Reaction was considered complete when 60° C. water was needed to hold the reaction temperature at 60–63° C.

The reaction temperature was then raised to 70–75° C., the agitator shut off, and the molten salts which formed during the reaction and which were more dense than the product layer were discharged out the bottom valve. The reaction mixture was cooled to 20–25° C., 5 gal. of nitrogen-purged deionized water added with cooling, and the resultant mixture agitated for 15 minutes. After standing for 15 minutes, the more dense wash water layer was discharged under an inert atmosphere of nitrogen. The yield of tetrakis (dimethylamino)-ethylene was 8.2 lb. (80% of theory). After a second water washing, this material was passed through activated alumina. The tetrakis (dimethylamino) ethylene obtained has a refractive index of 1.4793 at 25° C., a purity greater than 99% (by gas chromatography) and a boiling point of 36.7° C., at 1 mm., 63.8° C. at 5 mm. and 97.8° C. at 25 mm.

*Example II*

Liquid anhydrous dimethylamine (37.25 lb.) was charged, with cooling, into a dry evacuated autoclave. The temperature was raised to 60° C. and a total of 6.0 lb. of chlorotrifluoroethylene was fed into the reaction at such a rate that the reaction temperature was controlled in the 60–65° C. range by adjusting feed rate and jacket cooling water. After feeding was complete, reaction was continued in the 60–65° C. range for an additional four hours and then worked up as described in Example I. The yield of tetrakis(dimethylamino)ethylene was 8.4 lbs. (82% of theory).

*Example III*

Anhydrous dimethylamine (32 lbs.) was reacted with chlorotrifluoroethylene (10 lbs.; an 8.3:1 mole ratio) in a manner similar to that described in Example I and worked up as outlined above to yield 10.25 lbs. (60% of theory) of tetrakis(dimethylamino) ethylene.

*Example IV*

Anhydrous dimethylamine (38.75 lbs.) was reacted with chlorotrifluoroethylene (10.0 lbs.; a 10:1 mole ratio) in a manner similar to that described in Example I and worked up as outlined to yield 12.2 lbs. (71% of theroy) of tetrakis(dimethylamino)ethylene.

*Example V*

Anhydrous dimethylamine (31.0 lb.) was reacted with chlorotrifluoroethylene (8.0 lbs.; a 10:1 mole ratio) in a manner similar to that described in Example II and worked up as outlined above to afford 9.9 lbs. (72% of theory) of tetrakis(dimethylamino)ethylene.

*Example VI*

Anhydrous dimethylamine (39.0 lbs.) was reacted with chlorotrifluoroethylene (5.0 lbs.; a 20:1 mole ratio) in a manner similar to that described in Example II and worked up as outlined above to afford 6.3 lbs. (74% of theory) of tetrakis(dimethylamino)ethylene.

*Example VII*

Anhydrous dimethylamine (32 lbs.) was reacted with chlorotrifluoroethylene (10 lbs.; an 8.3:1 mole ratio) in a manner similar to that described in Example I. Temperature, however, peaked at 83° C., i.e., above the desired reaction temperature, resulting in a yield of only 7.9 lbs. (45% of theory) of tetrakis(dimethylamino) ethylene.

*Example VIII*

Anhydrous dimethylamine (38.75 lbs.) was reacted with chlorotrifluoroethylene (10.0 lbs.) in the presence of 50 g. of water in a manner similar to that described in Example I with careful control of reaction temperature. Work-up as described above afforded 13.25 lbs. (75% of theory) of tetrakis(dimethylamino)ethylene.

*Example IX*

A number of runs were made to test the effect of various treatments on the chemiluminescence of TMAE. The total light output over a 30-minute period from a 2 cc. sample of TMAE on 10 cc. of deoxygenated-deionized water in contact with air was obtained by integration. Light from the sample was directed into a photovoltaic cell, amplified and recorded. Integration was performed for each sample by means of a planimeter. The results are shown in the table which follows. The distillation technique (TREATMENT A) is that of Pruett et al.

TABLE

| Treatment | Integrated Light Output | Light Output (Percent) in Terms of Treatment A as Standard |
|---|---|---|
| A. Distillation | 50 | 100 |
| B. Single water washing | 181 | 362 |
| C. Single water washing and distillation | 252 | 504 |
| D. Double water washing | 251 | 501 |
| E. Double water washing and contact with activated alumina | 275 | 549 |

*Example X*

Anhydrous DMA (32 lbs.) was reacted with CTFE (10 lbs.; mole ratio 8.3:1) in the presence of tetrahydrofuran (7 lbs.) in the manner described in Example I. There was produced 11.7 lbs. of TMAE, corresponding to a 68% yield.

Under conditions that sometimes inadvertently arise during the manufacture of tetrakis(dimethylamino)ethylene employing the process of this invention, unacceptable off-grade material is produced. The quality is reduced by the presence of impurities which cause the product to be cloudy, dull, and orange to orange-brown in color. The pure product is clear and has a greenish-yellow fluorescence. Faulty material is obtained when the reaction between chlorotrifluoroethylene and dimethylamine (Step 1) is accidentally stopped before the haloethylene is completely reacted. It also results when the crude product is held in contact with the by-product molten salt (Step 2) too long, e.g., for a period in excess of about one hour.

The problem under these conditions is to reclaim the off-grade material by removing the detrimental impurities and provide a clear, high-grade product. An answer is found in an added step of washing the tetrakis(dimethylamino)ethylene with aqueous sodium hydroxide solution as hereinafter described.

An alternative process for the synthesis of tetrakis(dimethylamino)ethylene consists of the sequential steps heretofore described with the following step added after the present Step 4, i.e. that step of agitating the tetrakis (dimethylamino)ethylene at 35° C. to 80° C. for about one hour to four hours with a water solution consisting of from 0.04 part to 1 part by weight of sodium hydroxide dissolved in 1 part to 2 parts by weight of water per part by weight of tetrakis(dimethylamino)ethylene.

An incomplete reaction to form tetrakis(dimethylamino)ethylene in the first step of the invention process and also a contact of the crude product with hot molten salt for longer than about an hour in the second step forms unidentified impurities which have an adverse effect on the properties of the product. An immediately noticeable result is the turbidity, dullness, and orange to orange-brown color of the product. It has been discovered that these impurities are removed by washing the tetrakis(dimethylamino)ethylene with caustic soda solution to provide a clear, green-yellow liquid.

The sodium hydroxide may be varied between 0.04 part to 1 part by weight per part of tetrakis(dimethylamino)ethylene. With less than 0.04 part of sodium hydroxide its effectiveness diminishes; the amount of base is insufficient to remove completely the impurities. With more than 1 part of sodium hydroxide with 1 part of water the solubility limit of sodium hydroxide may be exceeded. The preferred range of sodium hydroxide is 0.5 part to 1 part by weight per part of tetrakis(dimethylamino)ethylene, while the preferred amount is 1 part.

The amount of water in the sodium hydroxide solution may be varied from 1 part to 2 parts per part by weight of tetrakis(dimethylamino)ethylene. These amounts of water with the amount of sodium hydroxide that may be used provide solutions that vary in strength from about 2% to 50%. Less than 1 part of water with the upper limit of sodium hydroxide may cause the solubility limit of the sodium hydroxide to be exceeded and produce a slurry troublesome for mixing with the water-insoluble organic phase. More than 2 parts of water, particularly with the lower limit of caustic, is less effective and may fail to remove completely the impurities. The preferred amount of water is 2 parts per part of tetrakis(dimethylamino)ethylene.

The temperature for the caustic washing step may vary between 35° and 80° C. Below 35° C., even with a high concentration of sodium hydroxide (0.33 part to 1 part with 1 part water or 25% to 50% solution) for an extended reaction time (4 hours), the caustic removal of undesirable impurities is incomplete. Above 80° C. decomposition of the tetrakis(dimethylamino)ethylene occurs. The preferred working temperature range for this step of the process is 50° to 60° C., the preferred temperature being 60° C.

The effective washing time is from about 1 hour to 4 hours. The preferred range is 1 hour to 2 hours while the preferred time is about 1 hour. A shorter time than 1 hour may result in an incomplete removal of the impurities that are caustic reactive and soluble in the caustic solution, especially at temperatures in the lower part of the range (35° to 45° C.). At 80° C., however, an effective caustic scrubbing may be effected in as short a time as 20 minutes to provide an acceptable product. Contact of the tetrakis(dimethylamino)ethylene with the sodium hydroxide solution for more than 4 hours at the higher temperature has no adverse effect and is not necessary with other conditions maintained within the limits defined. Similarly, the caustic washing has no adverse effect in cases where such washing is not needed to purify and improve the product.

*Example XI*

A batch of tetrakis(dimethylamino)ethylene, in being produced as described in Example I, was inadvertently held in contact with the by-product molten salts for about 2 hours. The finally isolated product was turbid and orange-brown in color. With 100 parts by weight of this off-grade material was mixed 200 parts by weight of water having dissolved therein 100 parts of sodium hydroxide. The mixture was heated to 60° C. for one hour with constant agitation. The tetrakis(dimethylamino)ethylene was then separated from the caustic solution, washed with water, and passed through activated alumina. The resultant product was a clear, light greenish-yellow fluorescent liquid.

Faulty material was also converted to an acceptable clear pure product by agitating the above caustic mixture at 35° C. for 4 hours. Similarly the off-grade product was purified by treatment of 100 parts by weight of tetrakis(dimethylamino)ethylene with 100 parts by weight of water containing 2 parts of sodium hydroxide, the contact with agitation being maintained for one hour at 40° C.

Since obvious modifications and equivalents in the invention will be evident to those skilled in the chemical arts, I propose to be bound solely by the appended claims.

The embodiments of the invention in which an exclusive property or privilege is claimed are as follows:

1. In the synthesis of tetrakis(dimethylamino)ethylene from dimethylamine and chlorotrifluoroethylene in an inert atmosphere, the improvement comprising the sequential steps of:
   (1) reacting dimethylamine and chlorotrifluoroethylene in a mole ratio between 8/1 and 20/1 at autogenous pressure and at a temperature in the range 45–70° C.;
   (2) raising the temperature of the reaction product of 1 to about 70° C. and separating the lower layer containing by-product molten salts therefrom;
   (3) cooling the product remaining from 2 to ambient temperature and drowning the same in 1–10 volumes of water;
   (4) separating the lower aqueous wash layer from the tetrakis(dimethylamino)ethylene, washing the tetrakis(dimethylamino)ethylene with from 1–10 volumes of water, withdrawing the aqueous layer; and
   (5) contacting the thus purified tetrakis(dimethylamino)ethylene with activated alumina.

2. The process of claim 1 wherein the temperature of Step 1 is 50–65° C.

3. In the synthesis of tetrakis(dimethylamino)ethylene from dimethylamine and chlorotrifluoroethylene in an inert atmosphere, the improving of chemiluminescent properties of said tetrakis(dimethylamino)ethylene by the sequential steps of: (1) reacting dimethylamine and chlorotrifluoroethylene in a mole ratio between 8/1 and 20/1 at autogenous pressure and at a temperature in the range 45–47° C.; (2) raising the temperature of the reaction product of 1 to about 70° C. and separating the lower layer containing by-product molten salts therefrom; (3) cooling the product remaining from 2 to ambient temperature and drowning the same in 1–10 volumes of water; (4) separating the lower aqueous wash layer from the tetrakis(dimethylamino)ethylene; and (5) contacting the thus purified tetrakis(dimethylamino)-ethylene with activated alumina.

4. The process of claim 3 wherein the temperature of Step 1 is 50–60° C.

5. In the synthesis of tetrakis(dimethylamino)ethylene from dimethylamine and chlorotrifluoroethylene in an inert atmosphere, the improvement comprising the sequential steps of:
   (1) reacting dimethylamine and chlorotrifluoroethylene in a mole ratio between 8/1 and 20/1 at autogenous pressure and at a temperature in the range 45–70° C.;
   (2) raising the temperature of the reaction product of 1 to about 70° C. and separating the lower layer containing by-product molten salts therefrom;
   (3) cooling the product remaining from 2 to ambient temperature and drowning the same in 1–10 volumes of water;
   (4) separating the lower wash layer from the tetrakis(dimethylamino)ethylene), washing the tetrakis(dimethylamino)ethylene with from 1–10 volumes of water, withdrawing the aqueous layer;
   (5) agitating said tetrakis(dimethylamino)ethylene at 35° to 80° C. for about 1 to 4 hours with a water solution consisting of from 0.04 part to 1 part, by weight, of sodium hydroxide dissolved in from 1 part to 2 parts, by weight, of water per part by weight of tetrakis(dimethylamino)ethylene; and
   (6) contacting the thus purified tetrakis(dimethylamino)ethylene with activated alumina.

No references cited.

CHARLES B. PARKER, *Primary Examiner.*

R. L. RAYMOND, *Assistant Examiner.*